United States Patent [19]

Attal et al.

[11] Patent Number: 4,641,530
[45] Date of Patent: Feb. 10, 1987

[54] ACOUSTIC MICROSCOPE FOR ANALYZING AN OBJECT IN DEPTH HAVING ASPHERICAL LENSES

[75] Inventors: Jacques Attal, Montpellier; Gaston Cambon, St. Gely du Fesc, both of France

[73] Assignee: Centre National de la Recherche Scientifique, France

[21] Appl. No.: 775,268

[22] Filed: Sep. 12, 1985

[30] Foreign Application Priority Data

Sep. 12, 1984 [FR] France ................. 84 13988

[51] Int. Cl.[4] .................................... G01N 29/04
[52] U.S. Cl. .............................. 73/606; 73/642
[58] Field of Search .............. 73/606, 607, 642; 367/150; 310/335; 181/176

[56] References Cited

U.S. PATENT DOCUMENTS 4,012,950  3/1977  Kompfner et al. ................ 73/618

OTHER PUBLICATIONS

Applied Physics Letters, vol. 24, No. 4, Feb. 15, 1974, pp. 163-165, American Institute of Physics, New York, R. A. Lemons et al., "Acoustic Microscope Scanning Version".

Toute l'Electronique, No. 492, Mar. 1984, pp. 56-58, Paris, J. Attal et al., "Progres de la Microscopie Acoustique dans l'Investigation des Solides".

Applied Optics, vol. 35, No. 5, Sep. 1979, pp. 385-387, American Institute of Physics, New York, V. B. Jipson, "Acoustic Microscopy of Interior Planes", p. 386, column 1, line 14, p. 386, column 2, line 2.

*Primary Examiner*—Stephen A. Kreitman
*Attorney, Agent, or Firm*—Cesari and McKenna

[57] ABSTRACT

An acoustic microscope for analyzing an object in depth has aspherical lenses. It comprises two identical bars arranged in the extension of one another and provided on their facing ends with a cavity, said cavities defining a pseudo-hyperbolic focussing lens and objective lens, whereby the foci of said two lenses coincide and the lenses are linked by a mercury or gallium drop in which can be immersed the object to be analyzed. The bars are provided at their other ends with a piezoelectric transducer. These transducers are able to produce ultrasonics focussed within the object by the focussing lens and are able to detect the ultrasonics reflected or transmitted by the object via the objective lens. These are also means for analyzing ultrasonics reflected or transmitted by the object and means for displacing the object in the focal plane of the two lenses.

5 Claims, 2 Drawing Figures

ACOUSTIC MICROSCOPE FOR ANALYZING AN OBJECT IN DEPTH HAVING ASPHERICAL LENSES

BACKGROUND OF THE INVENTION

The present invention relates to an acoustic microscope making it possible to analyse an object in depth and having aspherical lenses.

This microscope makes it possible to observe without damage and in depth structures of materials and in particular structures of integrated microelectronics circuits and biological cells. In the case of microelectronics, without destruction, the acoustic microscope makes it possible to test electronic components, produced e.g. on the same silicon pellet, at all stages of their production. Thus, it makes it possible to locate faults in these components, in planes parallel to the surface of the pellet or wafer, both on the surface and within said components. Furthermore, in view of the non-destructive nature of the acoustic microscope, it is possible to observe without staining a tissue sample and to, in this way, provide a rapid diagnosis with regards to the state of the tissue.

The acoustic microscope can also be used in micrometallurgy for accurately observing the relative orientation of the crystals and determining their limits without any prior polishing or chemical etching, as well as for analysing faults (microcracks, fractures) within these crystals.

The operating principle of acoustic microscopes is largely based on that of optical microscopes. This principle is in particular described in an article in Applied Physics Letters, vol. 24, no. 4, 15.2.1974 by R. A. Lemons and C. F. Quate.

Known acoustic microscopes comprise, inter alia, a focussing lens and a cylindrical objective lens, each machined at one of the ends of an acoustic propagation medium shaped like a bar and generally made from sapphire. The two bars are located in the extension of one another. Moreover, the foci of the two lenses coincide. A drop of liquid, such as water, makes it possible to link the two lenses.

A piezoelectric transducer is joined to the other end of the bars. One of the transducers makes it possible to produce ultrasonic waves within the drop of liquid, in which is immersed the object to be analysed and the other transducer makes it possible to detect the ultrasonic waves transmitted by the object. A mechanical device makes it possible to move the object in the focal plane of the two lenses, said focal plane corresponding to the observation plane of the object.

The aforementioned microscopes operate in transmission. However, microscopes operating in reflection are also known. The latter comprise a single lens either acting as a focussing lens, or as an objective lens, as well as an ultrasonic transducer acting either as a transmitter, or as a receiver.

These different microscopes make it possible to give images of objects with a definition better than 1 micron and a resolution comparable to that of the best optical microscopes.

Although these microscopes permit an excellent surface analysis of objects, it is only with difficulty that it is possible to carry out an in depth observation of the same objects therewith, which considerably limits the use thereof.

This problem encountered with depth analysis is mainly linked with the use of spherical lenses. Thus, in the bar or bars and the liquid drop there are two ultrasonic wave types which are propagated, namely longitudinal waves and transverse waves. These two types of waves, which are propagated at different speeds, the speed of longitudinal waves exceeding that of transverse waves, give rise, as a result of the spherical shape of the lenses, to two clearly different paraxial foci, one corresponding to the longitudinal waves and the other to the transverse waves. The existence of these two foci is very prejudicial to the microscopic in depth analysis of an object.

Apart from the shape of the lenses, the depth analysis of objects is difficult to perform in view of the nature of the liquid used, generally water, which has an acoustic impedance 10 to 60 times lower than that of the solid materials forming the objects to be analysed, which leads to an ultrasonic energy loss of approximately 80 to 95% making in depth observation very difficult.

SUMMARY OF THE INVENTION

The present invention relates to an acoustic microscope making it possible to obviate the aforementioned difficulties and in particular making it possible to analyse objects in depth.

More specifically, the present invention relates to an acoustic microscope of the type comprising two identical bars positioned in an extension of one another and provided at their facing ends with a cavity, said cavities defining at least one focussing lens and at least one objective lens, said two identical lenses having coinciding foci being linked by a liquid drop in which the object to be analysed can be immersed, the bars being provided at their other ends with a piezoelectric transducer, said transducers being able to produce ultrasonics focussed within the object by the focussing lens and to detect ultrasonics reflected or transmitted by the object via the objective lens, means for analysing the ultrasonics reflected or transmitted by the object and means for displacing the object in the focal plane of the two lenses, wherein the lenses have in each case a shape defined by the parametric equations:

$$x = N \frac{\left[ D + na - \frac{na}{\cos r} \right] \cos [\text{Arc } \sin(n \sin r)] - D}{\cos [\text{Arc } \sin(n \sin r)] - N} \text{ and}$$

$$y = a \, tg \, r + (D - x) \, tg \, [\text{Arc} \cdot \sin(n \sin r)]$$

in which N represents the relative refractive index $n_2/n_1$, $n_1$ being the index of the material forming the bars and $n_2$ the index of the liquid, n representing the relative refractive index $n_3/n_2$, in which $n_3$ is the index of the material forming the object, D represents the distance between the vertex of the lens and the surface of the object, a the distance between the surface of the object and the focal point of the lens and r the parameter, x being taken along the optical axis of the lens and y along the axis perpendicular to said optical axis.

The use of an aspherical or rather a pseudo-hyperbolic lens as defined hereinbefore makes it possible to obtain a strict stigmatism at the observation point of the object. This means in the case of the focussing lens that all the ultrasonic rays from said lens arrive at a single focus in the object and in connection with the objective lens this means that all the ultrasonic rays from the object come from the same point, which is the focal point of the objective lens. This stigmatism is more particularly obtained by eliminating longitudinal waves in the longitudinal plane of the object.

Advantageously the drop of liquid is a drop of mercury or gallium. These metals have the advantage of being liquid at ambient temperature and of having acoustic impedences comparable to those of most solids, i.e. the materials constituting the objects to be analysed. These materials make it possible to obtain in-depth images with a resolution 2 to 4 times better than when using water.

According to a preferred embodiment of the microscope according to the invention, the piezoelectric transducers have a zinc oxide or lithium niobate layer between a gold electrode and an aluminium electrode, the gold electrode being in contact with the corresponding bar.

BRIEF DESCRIPTION OF THE DRAWING

The invention is described in greater detail hereinafter relative to non-limitative embodiments and the attached drawing, wherein show.

DETAILED DESCRIPTION OF THE PREFERRED EMBODIMENTS

Figure 1:
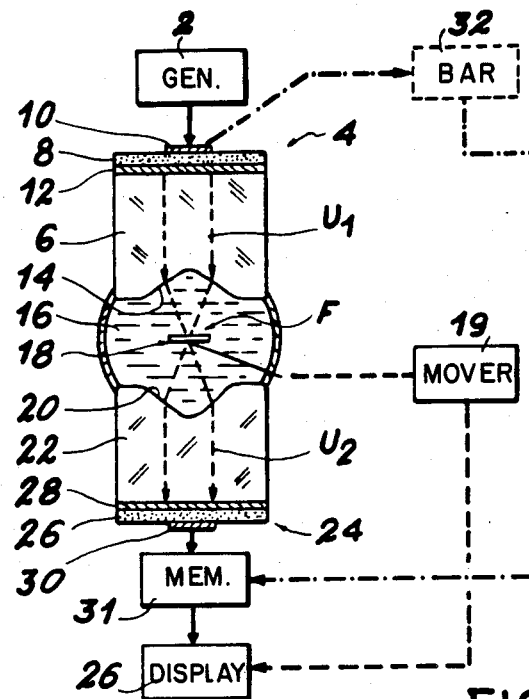
FIG. 1 Diagrammatically an acoustic microscope according to the invention.

The acoustic microscope shown in FIG. 1 comprises a high frequency generator 2 producing electromagnetic waves of frequency between 600 and 3000 MHz used for exciting a piezoelectric transducer 4. The latter converts the electromagnetic waves into ultrasonic waves in the form of a beam $U_1$ propagating within an acoustic propagation medium 6 in the form of a bar. The frequency of the ultrasonic waves is the same as that of the exciting electromagnetic waves.

The piezoelectric transducer 4 can be constituted by a thin film 8 of a piezoelectric material, such as zinc oxide or lithium niobate inserted between two electrodes 10 and 12. The thickness of film 8 is equal to a fraction of the wavelength of the soundwaves used. Electrode 10, which is more particularly made from aluminium, defines the dimensions of the ultrasonic beam $U_1$, electrode 12, which is more particularly made from gold, is in contact with the propagation medium 6.

Bar 6, which is particular made from sapphire or silica, is provided at its other end with a pseudo-hyperbolic acoustic lens 14 defined by a cavity hollowed out and polished in bar 6 and having a diameter ranging between 30 microns and a few millimeters. This acoustic lens 14, which is in contact with a liquid medium 16, in which the propagation speed of the ultrasonic waves is below that in the acoustic medium 6, more particularly constitutes a focussing lens making it possible to focus ultrasonic waves from bar 6 at a point F located within liquid drop 16. Object 18 which it is wished to observe is immersed in the liquid drop 16, which is preferably a drop of mercury or gallium. Means 19 make it possible to move object 18 in two perpendicular direction in the focal plane of lens 14, said focal plane corresponding to the observation plane of the object. This displacement means 19 can be constituted by all known systems, particularly that described in U.S. Pat. No. 4,012,950 of Dec. 12, 1974 and in more general terms by those used conventionally in optical or electronic microscopes.

The microscope also comprises a pseudo-hyperbolic acoustic lens 20 in contact with liquid drop 16. As hereinbefore, acoustic lens 20 is defined by a cavity hollowed out and polished in a bar-like acoustic propagation medium 22, constitutes the objective lens of the microscope. Lens 20, which is preferably identical to lens 14, makes it possible to convert the ultrasonic waves transmitted by the object 18 to be observed into a parallel beam $U_2$. This ultrasonic wave beam $U_2$, whose intensity and/or phase are dependent on special elastic characteristics of object 18 is detected by a piezoelectric transducer 24 located at the other end of bar 22. Transducer 24 makes it possible to supply an electric signal of the same frequency as that of the acoustic waves received, in the direction of a display system 26, e.g. of the cathode ray type, on which can be displayed the image of the object.

The display of the image of the object is formed point-by-point, by moving the object 18 with the aid of means 19 along one line and then line by line. The electric signals from transducer 24 are used, following acquisition on a known memory 31, for modifying the intensity of the cathode ray tube electron beam. The synchronism between the movement of the object and the scanning of the electron beam is ensured by known position sensors. The magnifications achieved range between about 10 and a few thousand.

As hereinbefore, bar 22 can be made from sapphire or silica. In the same way, piezoelectric transducer 24 can be constituted by a film 26 of piezoelectric material, particularly lithium niobate or zinc oxide, placed between two electrodes 28 and 30, made respectively from gold and aluminium, electrode 28 being in contact with bar 22.

In order to obtain a faithful image of the object 18 to be observed, the focal point of acoustic lens 20 must coincide with that of lens 14.

The acoustic lens shown in FIG. 1 operates in transmission, i.e. the analysis of object 18 takes place on the basis of ultrasonic waves transmitted by the latter. However, said microscope which has a symmetry with respect to the focal plane of the lenses in which the object 18 is located can operate in reflection, i.e. the analysis of the object takes place on the basis of ultrasonic waves reflected by said object.

In this case, the focussing lens 14 also serves as an objective lens and the piezoelectric transducer 4 also serves as a receiver or detector. A conventional electronic system 32 must then be provided at the input of memory 31, in order to separate the electric signals transmitted by transducer 4 and those received by the latter.

The operation in reflection of the microscope can obviously be carried out in the same way as hereinbefore by means of acoustic lens 20 and piezoelectric transducer 24.

In order to carry out an analysis within an object 18, such as an integrated circuit or a living cell, with a resolution and definition of the order of 1 micron, lenses 14 and 20 have a special aspherical shape defined by the following parametric equations:

$$x = N \frac{\left[ D + na - \frac{na}{\cos r} \right] \cos [\text{Arc sin } (n \sin r)] - D}{\cos [\text{Arc sin } (n \sin r)] - N} \text{ and}$$

-continued
$$y = a \, tg \, r + (D - x) \, tg \, [\text{Arc sin} \, (n \sin r)]$$

Figure 2:
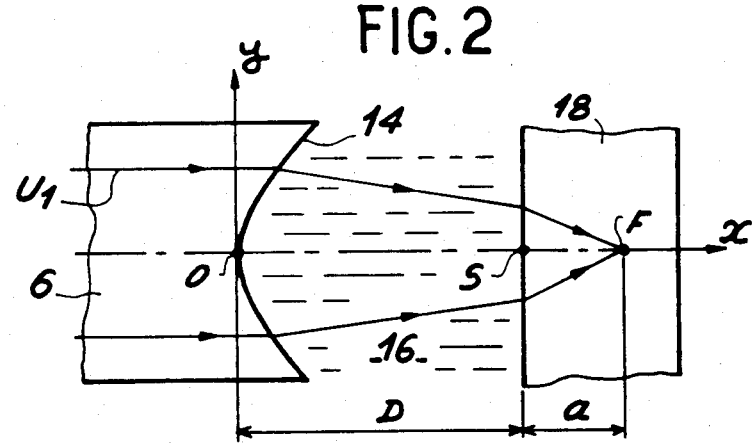
FIG. 2 Part of the microscope of FIG. 1 at the focussing lens.

The meaning of the different symbols used in these two equations will be given with reference to FIG. 2, which shows that part of the microscope of FIG. 1 containing the focussing lens 14, the liquid drop 16 and the object 18 to be observed. It is obvious that this explanation also applies to objective lens 20.

In the above equations, x is taken along the optical axis of the lenses, particularly that of lens 14 (FIG. 2) and y is taken perpendicular to the optical axis. In these equations, r represents the parameter which has to be eliminated in order to obtain curve $y=f(x)$ defining the shape of the acoustic lenses. Moreover, D represents the distance between the vortex O of lens 14 and the surface S of object 18 and a represents the distance between the surface S of the object and the focal point F of lens 14, i.e. the depth of the object at which the analysis takes place. Finally N represents the relative refractive index $n_2/n_1$, $n_1$ being the index of the material forming bar 6 and $n_2$ the index of the liquid 16, whilst n represents the relative refractive index $n_3/n_2$, in which $n_3$ is the index of the material forming object 18 in the observation plane or focal plane of the lens.

These pseudo-hyperbolic lenses make it possible to obtain a strict stigmatism, so that in the case of the focussing lens it is possible to obtain a perfect focussing of all the ultrasonic rays arriving on the plane of the object to be examined.

These profiles differ as a function of the chemical constitution of the object to be observed, the acoustic medium 6 or 22 and the liquid 16 used and according to the depth at which the observation of the object is to take place. These profiles can easily be determined with a random computer.

In order to obtain a good resolving power, the pseudo-hyperbolic lenses according to the invention must have a minimum diameter. Thus, an excessive lens size leads to a relatively high acoustic energy loss by absorption of said energy in the liquid. However, a reduction in the diameter of the lenses, i.e. their aperture leads to an increase in diffraction at said lenses, which modifies the contrast of the image of the displayed object. To obviate this, it is merely necessary to increase the frequency of the soundwaves. This frequency regulation can be carried out successively for a given lens during the actual observation of the object.

Focussing and/or objective lenses for an acoustic microscope operating in reflection have been produced in sapphire for use with mercury and in order to analyse a silicon wafer at a depth of 0.4 mm. The lenses with a diameter of 1.50 mm used with a frequency of the ultrasonic waves of 2.80 GHz have a resolving power of 0.9 µm.

In the same way, lenses have been produced from sapphire for use with gallium and in order to analyse a silicon wafer at a depth of 0.4 mm. These lenses, with a diameter of 2.50 mm and used with a frequency of the ultrasonic waves of 2.20 GHz have a resolving power of 1.20 µm.

Moreover, lenses have been produced from sapphire for use with mercury and for analysing an aluminium wafer at different depths. The results are given in the following Table I, in which a is the observation depth, φ the diameter of the lenses, f the frequency of the soundwaves and R the resolving power.

TABLE I

| | | | | | | | |
|---|---|---|---|---|---|---|---|
| $a_{mm}$ | 0.01 | 0.05 | 0.25 | 0.50 | 1 | 5 | 10 |
| $\phi_{mm}$ | 0.04 | 0.15 | 0.70 | 1.40 | 2.70 | 13.40 | 26.70 |
| $f_{GHz}$ | 4.10 | 3.10 | 1.80 | 1.40 | 1 | 0.50 | 0.40 |
| $R_{\mu m}$ | 0.40 | 0.50 | 0.80 | 1.10 | 1.50 | 2.90 | 4.10 |

In the same way, lenses were made from sapphire for use with mercury and for analysing a copper wafer at different depths. The results are given in the following Table II.

TABLE II

| | | | | | | | |
|---|---|---|---|---|---|---|---|
| $a_{mm}$ | 0.01 | 0.05 | 0.25 | 0.50 | 1 | 5 | 10 |
| $\phi_{mm}$ | 0.09 | 0.36 | 1.70 | 3.40 | 6.70 | 33.90 | 65.70 |
| $f_{GHz}$ | 3 | 1.80 | 0.90 | 0.60 | 0.40 | 0.20 | 0.15 |
| $R_{\mu m}$ | 0.40 | 0.65 | 1.35 | 1.85 | 2.60 | 5.75 | 8.00 |

What is claimed is:

1. An acoustic microscope permitting the analysis of an object in depth comprising two identical bars positioned in an extension of one another and provided at their facing ends with a cavity, said cavities defining at least one focussing lens and at least one objective lens, said two identical lenses having coinciding foci being linked by a liquid drop in which the object to be analysed can be immersed, the bars being provided at their other ends with a piezoelectric transducer, said transducers being able to produce ultrasonics focussed within the object by the focussing lens and to detect ultrasonics reflected or transmitted by the object via the objective lens, means for analysing the ultrasonics reflected or transmitted by the object and means for displacing the object in the focal plane of the two lenses, wherein the lenses have in each case a shape defined by the parametric equations:

$$x = N \frac{\left[D + na - \dfrac{na}{\cos r}\right] \cos [\text{Arc sin}(n \sin r)] - D}{\cos [\text{Arc sin}(n \sin r)] - N} \text{ and}$$

$$y = a \, tg \, r + (D - x) \, tg \, [\text{Arc} \cdot \sin(n \sin r)]$$

in which N represents the relative refractive index $n_2/n_1$, $n_1$ being the index of the material forming the bars and $n_2$ the index of the liquid, n representing the relative refractive index $n_3/n_2$, in which $n_3$ is the index of the material forming the object, D represents the distance between the vertex of the lens and the surface of the object, a the distance between the surface of the object and the focal point of the lens and r the parameter, x being taken along the optical axis of the lens and y along the axis perpendicular to said optical axis.

2. An acoustic microscope according to claim 1, wherein the ultrasonics have a frequency between 600 and 3000 MHz.

3. An acoustic microscope according to claim 1, wherein the liquid is mercury or gallium.

4. An acoustic microscope according to claim 1, wherein the piezoelectric transducers have a zinc oxide or lithium niobate layer between a gold electrode and an aluminium electrode, the gold electrode being in contact with the corresponding bar.

5. An acoustic microscope according to claim 1, wherein the bars are made from sapphire or silica.

* * * * *